June 10, 1947.  G. H. BROWN  2,422,076
ANTENNA SYSTEM
Filed July 28, 1943  2 Sheets-Sheet 1
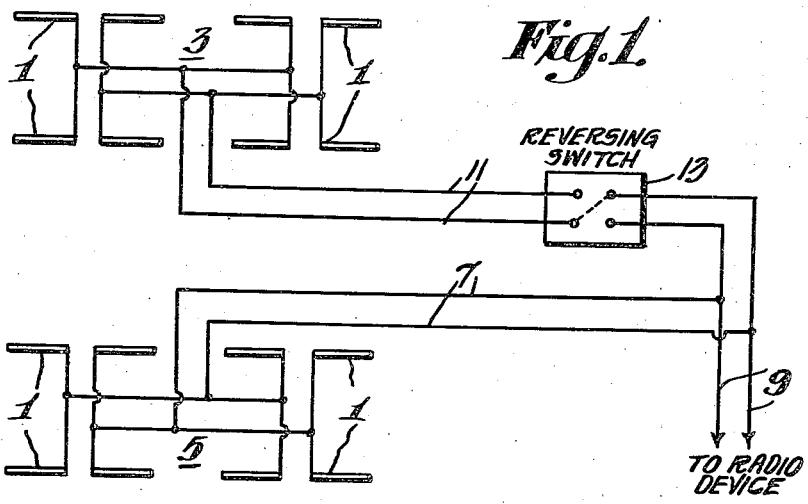
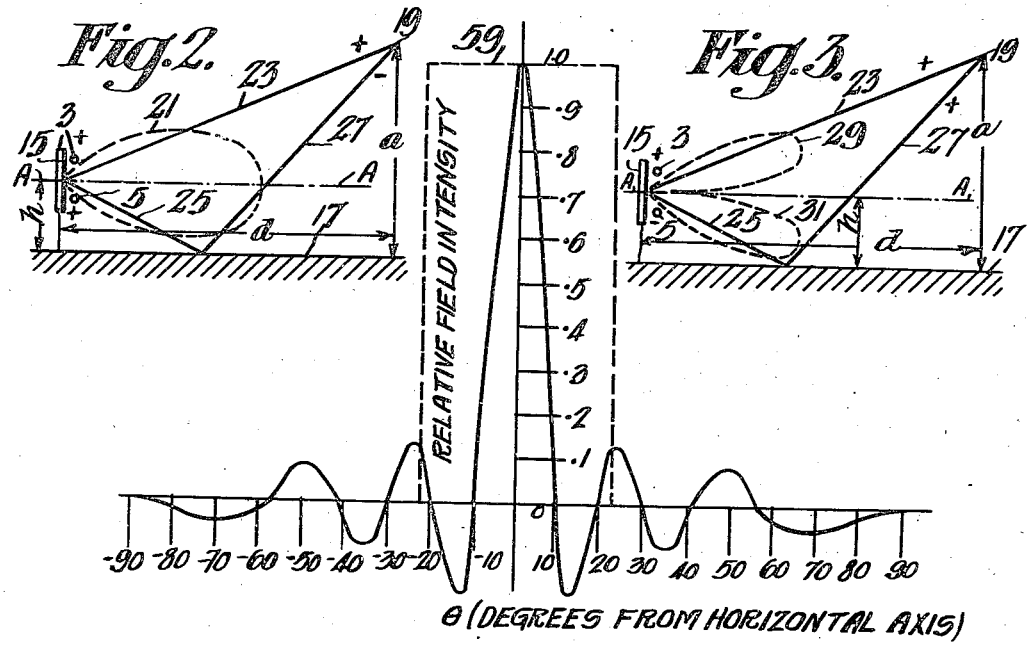
Inventor
George H. Brown
By
CD Tucka
Attorney June 10, 1947.    G. H. BROWN    2,422,076
ANTENNA SYSTEM
Filed July 28, 1943    2 Sheets-Sheet 2
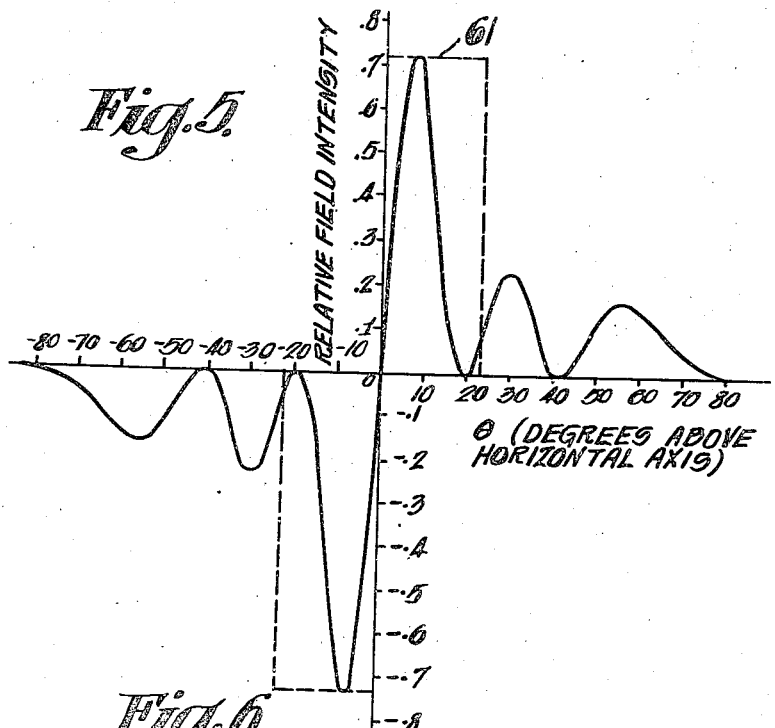
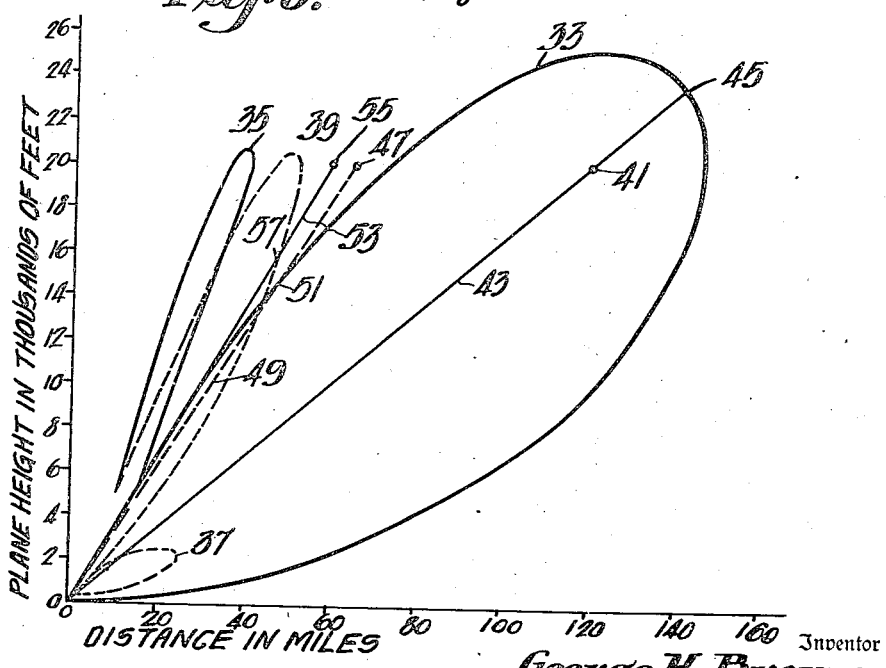
Inventor
George H. Brown
By
CD Tuska
Attorney Patented June 10, 1947

2,422,076

UNITED STATES PATENT OFFICE 2,422,076

ANTENNA SYSTEM

George H. Brown, Princeton, N. J., assignor to Radio Corporation of America, a corporation of Delaware Application July 28, 1943, Serial No. 496,426

2 Claims. (Cl. 250—11)

This invention relates to antenna systems, and more particularly to improvements in the art of radio transmission between a station located near the surface of the earth and points at relatively high altitude, such as aircraft or the like. Owing to the fact that the surface of the earth acts as a reflector of radio waves, the energy radiated by a transmitter will reach a given point by at least two paths, i. e., the direct path, and a longer path including a reflection from the earth. If the two paths differ in length by an amount such that the direct and reflected waves reach a given point 180° out of phase, cancellation occurs at that particular point and the net energy arriving there from the transmitter is substantially zero. Conversely, if the two path lengths do not differ by this amount, cancellation is not complete, and in fact complete addition will take place when the path length difference is such that the direct and reflected waves arrive in phase.

The above remarks may be restated briefly as follows:

An antenna near the surface of the earth will exhibit a vertical directive pattern having various lobes and gaps. The angles of these lobes with respect to the horizontal plane will depend upon the height of the antenna from the surface, the wavelength of the radiation, and the vertical directive pattern of the antenna itself. The directivity caused by reflection from the earth is superimposed upon the directivity of the antenna as it would be in space.

When transmission is attempted between a fixed station and a moving object, with a constant vertical directive pattern, the signal will alternately increase to a maximum and decrease to a very low value as the moving object travels, unless the travel happens to be along a line parallel to the axis of a lobe of the vertical directive pattern. This effect is particularly important in the operation of radio aircraft locators and the like, where it is essential that continuous contact be maintained.

It is the principal object of the present invention to provide an improved method of and means for radio transmission between a fixed station and a moving object.

Another object is to provide an improved method of and means for selectively producing overlapping or complementary vertical directive patterns, whereby the gaps in each of said patterns are filled by the lobes of the other of said patterns.

A further object is to provide an improved antenna system capable of selectively producing complementary vertical directive patterns.

These and other objects will become apparent to those skilled in the art upon consideration of the following description, with reference to the accompanying drawings, of which:

Figure 1 is a schematic diagram of an antenna system according to the invention, Figures 2 and 3 are schematic elevations illustrating qualitatively the operation of the system of Fig. 1, Figures 4 and 5 are graphs illustrating the vertical space directive patterns obtainable with an antenna constructed in accordance with the principles set forth in the description of Fig. 1, and Figure 6 is a graph of the vertical directive patterns produced by an antenna having the characteristics illustrated by Figs. 2 and 3, taking into consideration reflections from the surface of the earth.

Referring to Fig. 1, a typical antenna array is shown comprising a plurality of spaced dipoles 1. The dipoles 1 are connected through transmission line networks to each other and to a radio device, such as a transmitter or receiver, not shown. The number of dipoles and their spacing and arrangement with respect to each other is determined in accordance with well known principles to provide any desired horizontal directive pattern. A reflector or conductive screen, not shown, may be provided to produce unidirectional horizontal directivity.

The radiators are divided into upper and lower groups, generally designated by the reference numerals 3 and 5 respectively. The lower group 5 is directly connected through lines 7 to main lines 9. The upper group 3 is connected through lines 11 and a reversing switch 13 to lines 9. The switch 13 is preferably of the type described in copending application, Serial Number 485,383, filed on May 1, 1943, by Donald W. Peterson, entitled Radio frequency switch. By means of the switch 13, it is possible to operate the radiators of upper group 3 either in phase or out of phase with the corresponding elements of the lower group 5.

Referring to Fig. 2, the radiator groups 3 and 5 are supported adjacent a reflector or a screen 15 with the horizontal axis A—A of the array at a height $h$ above the earth's surface 17. Assume that it is desired to effect transmission to a point 19 at a horizontal distance $d$ from the antenna system and at an altitude $a$. If the radiator groups 3 and 5 are energized in phase with each other as indicated by the + signs, the space radiation pattern will comprise substantially a single horizontally directed lobe, as designated by the dash line 21. Energy will travel along the direct path 23 and along the reflection path comprising the legs 25 and 27. Upon reflection from the earth, the polarity of the wave is reversed as indicated by the — sign adjacent to the leg 27. The phase relationship between the direct and reflected waves arriving at the point 19 depends upon the difference in length of the paths 23 and 25, 27 in wavelengths. Assume that these conditions are such that the direct and reflected waves arrive at the point 19 substantially out of phase, resulting in cancellation. Now, if the radiator groups 3 and 5 are reversed in phase with respect to each other, as indicated in Fig. 3, the space directive pattern will comprise two lobes 29 and 31 of opposite polarities. The lobe 29 is directed at an angle above the horizontal axis of the antenna while the lobe 31 is directed at an equal angle below the axis. With the distance $d$ and $a$ the same as in Fig. 2, the paths of the direct and reflected waves will differ by the same amount as in Fig. 2. However, the reflected wave will now arrive substantially in phase with the direct wave at the point 19, providing addition rather than cancellation. Thus it is possible to maintain transmission to any given point by operating the radiators 3 and 5 either in phase or out of phase.

Fig. 4 is a graph in rectangular coordinates of the vertical free space directive pattern of an antenna constructed in accordance with Fig. 1, with the upper and lower radiator groups energized in phase. It is apparent that the maximum radiation occurs at zero degrees or in a horizontal direction, with secondary lobes at approximately 25° and 50° above and below the horizontal axis. The negative loops at 15, 35 and 70 degrees represent other secondary lobes in which the polarity is negative with respect to the principal lobe. Referring to Fig. 5, the same antenna arrangement with the upper and lower radiator groups energized out of phase produces a directive pattern having a principal positive lobe at approximately 10° above the horizontal axis and a principal negative lobe directed at an equal angle below the horizontal axis. Secondary positive lobes occur at 30° and 55° above the axis with corresponding negative lobes below the axis.

Fig. 6 shows the resultant vertical directive patterns which are provided by an antenna having the characteristics shown in Figs. 4 and 5 when the effects of reflection from the earth are included. The solid lines 33 and 35 indicate the pattern obtained when the upper and lower radiator groups are energized in phase and the dash lines 37 and 39 indicate the pattern obtained when the radiator groups are energized in opposite phase. The field strength at any particular point is a function of the length of a line drawn radially from the zero axis through the point in question, to the boundary of the lobe within which the point lies. For example, assume that an airplane is flying toward the antenna at an altitude of 20,000 feet. The position of the airplane, when its horizontal distance from the antenna system is 120 miles, is represented by the point 41. With the upper and lower radiators energized in phase, the field intensity at the point 41 is proportional to a function of the length of the line 43, between the zero axis and the intersection 45.

As the craft moves horizontally toward the antenna, the field intensity will decrease, the rate of decrease becoming greater as the boundary 33 is approached. Thus when the horizontal distance from the transmitter is 65 miles, as indicated by the point 47, the field intensity has decreased to a value represented by the distance of the point 51 from the origin as measured along the line 49. At 60 miles, the field intensity with both radiators energized in phase is substantially zero, as indicated by the line 53, drawn to the point 55. However, if the radiators are operated out of phase, the field intensity at the point 55 is represented by the distance along the line 53 to the point 57 where it intersects the boundary 39. As the plane travels further along its horizontal course, the signal will again drop out at approximately 43 miles, whereupon the radiators may be again operated in phase to utilize the lobe 35. At about 35 miles, if the plane continues to fly at an altitude of 20,000 feet, the signal will again disappear. The subsequent pattern lobes are not shown in Fig. 6.

The various lobes of the patterns of Fig. 6 are of widely different intensity. Variations of the extent shown in Fig. 6 have been found in practice to be not seriously objectionable. As a matter of interest, the ideal space directive patterns, which would be required to cause all of the lobes to be of equal intensity, are indicated by the dash lines 59 and 61 in Figs. 4 and 5 respectively. Such directive patterns may be approached within any desired degree by the use of arrays having large enough dimensions and a sufficient number of radiator elements.

Thus the invention has been described as an improved antenna system for providing complementary vertical directive patterns. The radiator array is divided into two groups, one above the other, and means are provided for energizing the upper and lower groups selectively in phase or out of phase. By this means, it is possible to provide effective coverage over a wide range of elevation angle, while utilizing the entire antenna array under all conditions. It will be clear to those skilled in the art that the described system may be operated for reception, providing directive patterns identical with those obtained when the system is used for transmission. The signals picked up by the two arrays are combined directly, or with phase reversal of one signal, to selectively receive in one or the other of two complementary vertical directive patterns.

The invention covered herein may be manufactured and used by or for the Government of the United States for governmental, military, naval and national defense purposes without payment to me or assigns of any royalty thereon.

I claim as my invention:

1. In a radio aircraft locator system wherein signals are transmitted from a ground station to an aircraft, and received at said ground station after reflection by said craft, the method of filling gaps in the transmission of signals between said ground station and said craft caused by destructive interference between directly transmitted signals and signals reflected from the surface of the earth, comprising the steps of radiating and receiving energy at said ground station at a point a predetermined height above the surface of the earth, simultaneously radiating and receiving energy at said ground station at a second point at a different height, and reversing the phase of the energy transmitted and received at one of said points upon the occurrence of a gap in the transmission between said ground station and said craft.

2. The method of providing substantially continuous radio transmission between a ground station and a moving aircraft, comprising the steps of transmitting and receiving energy at a point a predetermined height above the surface of the earth at said ground station, simultaneously transmitting and receiving energy at a second point at a different predetermined height at said ground station, and reversing the phase of the energy transmitted and received at one of said points upon the reduction in transmission between said station and said craft below a predetermined value.

GEORGE H. BROWN.

REFERENCES CITED

The following references are of record in the file of this patent:

UNITED STATES PATENTS

| Number | Name | Date |
| --- | --- | --- |
| 2,213,859 | Hahnemann | Sept. 3, 1940 |
| 2,242,910 | Hahnemann | May 20, 1941 |
| 2,297,228 | Kramar | Sept. 29, 1942 |
| 2,307,184 | Alford | Jan. 5, 1943 |
| 2,038,539 | Carter | Apr. 28, 1936 |
| 2,046,849 | Runge et al. | July 7, 1936 |
| 2,094,333 | Smith | Sept. 28, 1937 |
| 2,373,090 | Alford | Apr. 10, 1945 |